United States Patent
Hori et al.

(10) Patent No.: US 11,657,654 B2
(45) Date of Patent: May 23, 2023

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Takashige Hori, Aisai (JP); Masaru Wakabayashi, Nagoya (JP); Yoko Sakurai, Anjo (JP); Ken Ishikawa, Anjo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 157 days.

(21) Appl. No.: 17/215,551

(22) Filed: Mar. 29, 2021

(65) Prior Publication Data
US 2021/0304520 A1     Sep. 30, 2021

(30) Foreign Application Priority Data
Mar. 30, 2020   (JP) .............................. JP2020-061021

(51) Int. Cl.
*G01C 21/34*   (2006.01)
*G01C 21/36*   (2006.01)
(Continued)

(52) U.S. Cl.
CPC ....... *G07B 15/063* (2013.01); *G01C 21/3461* (2013.01); *G01C 21/3602* (2013.01);
(Continued)

(58) Field of Classification Search
CPC .. B60W 30/06; B60W 30/09; B60W 30/0956; B60W 30/12; B60W 30/165; B60W 50/10; B60W 60/0011; B60W 60/00253; G01C 21/3461; G01C 21/3492; G01C 21/3602; G01C 21/3617; G01C 21/3658; G07B 15/06; G07B 15/063; G08G 1/0116; G08G 1/0133; G08G 1/0137; G08G 1/0145; G08G 1/065; G08G 1/09626;
(Continued)

(56) References Cited

U.S. PATENT DOCUMENTS

| | | | |
|---|---|---|---|
| 2014/0005923 A1 | 1/2014 | Bank et al. | |
| 2020/0041299 A1* | 2/2020 | Kato | ...................... G06Q 50/30 |
| 2020/0109955 A1* | 4/2020 | Prabhudeva | .......... G06Q 20/127 |

FOREIGN PATENT DOCUMENTS

| | | | |
|---|---|---|---|
| JP | 2008-31779 A | 2/2008 | |
| JP | 2008-299752 A | 11/2008 | |

(Continued)

*Primary Examiner* — Stephen R Burgdorf
(74) *Attorney, Agent, or Firm* — Oblon, McClelland, Maier & Neustadt, L.L.P.

(57) ABSTRACT

This disclosure makes vehicle passage at a tollbooth on a vehicle road smoother. A plurality of candidate lanes are selected based on whether or not a first vehicle scheduled to pass through a tollbooth is an ETC vehicle, and the type of each lane at the tollbooth. Moreover, a predicted value in correlation with a required time predicted to be required for passing through the tollbooth is calculated for each candidate lane. Further, a recommended lane that is recommended for the first vehicle to travel is determined from the plurality of candidate lanes based on the predicted value for each candidate lane.

12 Claims, 10 Drawing Sheets

(51) Int. Cl.
 *G08G 1/01* (2006.01)
 *G07B 15/06* (2011.01)
 *G08G 1/065* (2006.01)
(52) U.S. Cl.
 CPC ....... *G01C 21/3617* (2013.01); *G08G 1/0133* (2013.01); *G08G 1/0145* (2013.01); *G08G 1/065* (2013.01)
(58) Field of Classification Search
 CPC ....... G08G 1/096716; G08G 1/096741; G08G 1/096775; G08G 1/0968; G08G 1/096783; G08G 1/096811
 USPC ......................................................... 340/928
 See application file for complete search history.

(56) References Cited

FOREIGN PATENT DOCUMENTS

| | | | | |
|---|---|---|---|---|
| JP | 2008299752 A | * | 12/2008 | ............. G07B 15/00 |
| WO | WO 2018/142576 A1 | | 9/2018 | |

* cited by examiner

| VEHICLE INFORMATION | | |
|---|---|---|
| VEHICLE ID | ETC INFORMATION | POSITIONAL INFORMATION |
| V001 | ETC VEHICLE | ... |

Fig. 4

TOLLBOOTH INFORMATION

| LANE NO. | TYPE | NUMBER OF WAITING VEHICLES | NUMBER OF ETC VEHICLES |
|---|---|---|---|
| #1 | ETC LANE | 0 | 0 |
| #2 | SHARED LANE | 2 | 1 |
| #3 | NON-ETC LANE | 2 | 0 |
| #4 | NON-ETC LANE | 3 | 0 |
| #5 | ETC LANE | 2 | 2 |
| #6 | CLOSED | — | — |
| #7 | ∨ | 1 | 1 |

Fig. 5

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-061021, filed on Mar. 30, 2020, which is hereby incorporated by reference herein in its entirety.

BACKGROUND

Technical Field

This disclosure relates to technology for managing vehicle passage through a tollbooth on a vehicle road.

Description of the Related Art

Japanese Patent Laid-Open No. 2008-031779 discloses a structure in which one lane or a plurality of lanes are separated from other adjacent lanes at a place where a traffic jam occurs on a limited-access road.

CITATION LIST

Patent Document

[Patent document 1] Japanese Patent Laid-Open No. 2008-031779

SUMMARY

An object of this disclosure is to provide technology that enables smoother vehicle passage through a tollbooth on a vehicle road.

An information processing apparatus according to a first aspect of this disclosure includes a controller configured to: select a plurality of candidate lanes in which a first vehicle can travel at a tollbooth based on whether or not the first vehicle scheduled to pass through the tollbooth is an ETC vehicle, and a type of each lane at the tollbooth; calculate a predicted value for each candidate lane, the predicted value being in correlation with a required time predicted to be required for the first vehicle driving in the candidate lane to pass through the tollbooth; and determine a recommended lane that is recommended for the first vehicle to travel, from the plurality of candidate lanes based on the predicted value for each candidate lane.

An information processing method according to a second aspect of this disclosure is executed by a computer and includes: selecting a plurality of candidate lanes in which a first vehicle can travel at a tollbooth based on whether or not the first vehicle scheduled to pass through the tollbooth is an ETC vehicle, and a type of each lane at the tollbooth; calculating a predicted value for each candidate lane, the predicted value being in correlation with a required time predicted to be required for the first vehicle driving in the candidate lane to pass through the tollbooth; and determining a recommended lane that is recommended for the first vehicle to travel, from the plurality of candidate lanes based on the predicted value for each candidate lane.

A non-transitory storage medium according to a third aspect of this disclosure is mounted on a vehicle and stores a program executed by a computer controlling an in-vehicle device that communicates with an information processing apparatus, wherein the information processing apparatus includes a controller configured to: select a plurality of candidate lanes in which the vehicle can travel at the tollbooth based on whether or not the vehicle scheduled to pass through the tollbooth is an ETC vehicle, and a type of each lane at the tollbooth; calculate a predicted value for each candidate lane, the predicted value being in correlation with a required time predicted to be required for the vehicle driving in the candidate lane to pass through the tollbooth; and determine a recommended lane that is recommended for the vehicle to travel, from the plurality of candidate lanes based on the predicted value for each candidate lane, and the program is configured to cause the in-vehicle device to: transmit vehicle information containing information indicating whether or not the vehicle is an ETC vehicle, and request information that requests notification of the recommended lane to the information processing apparatus; and receive notification information that notifies the recommended lane determined by the controller, from the information processing apparatus.

According to this disclosure, smoother vehicle passage through a tollbooth on a vehicle road can be achieved.

BRIEF DESCRIPTION OF THE DRAWINGS

FIG. 4 is a diagram illustrating an example of a vehicle information table configuration transmitted from the in-vehicle device to the management server;

FIG. 5 is a diagram illustrating an example of a tollbooth information table configuration stored in a tollbooth information database;

DESCRIPTION OF THE EMBODIMENTS

Figure 1:
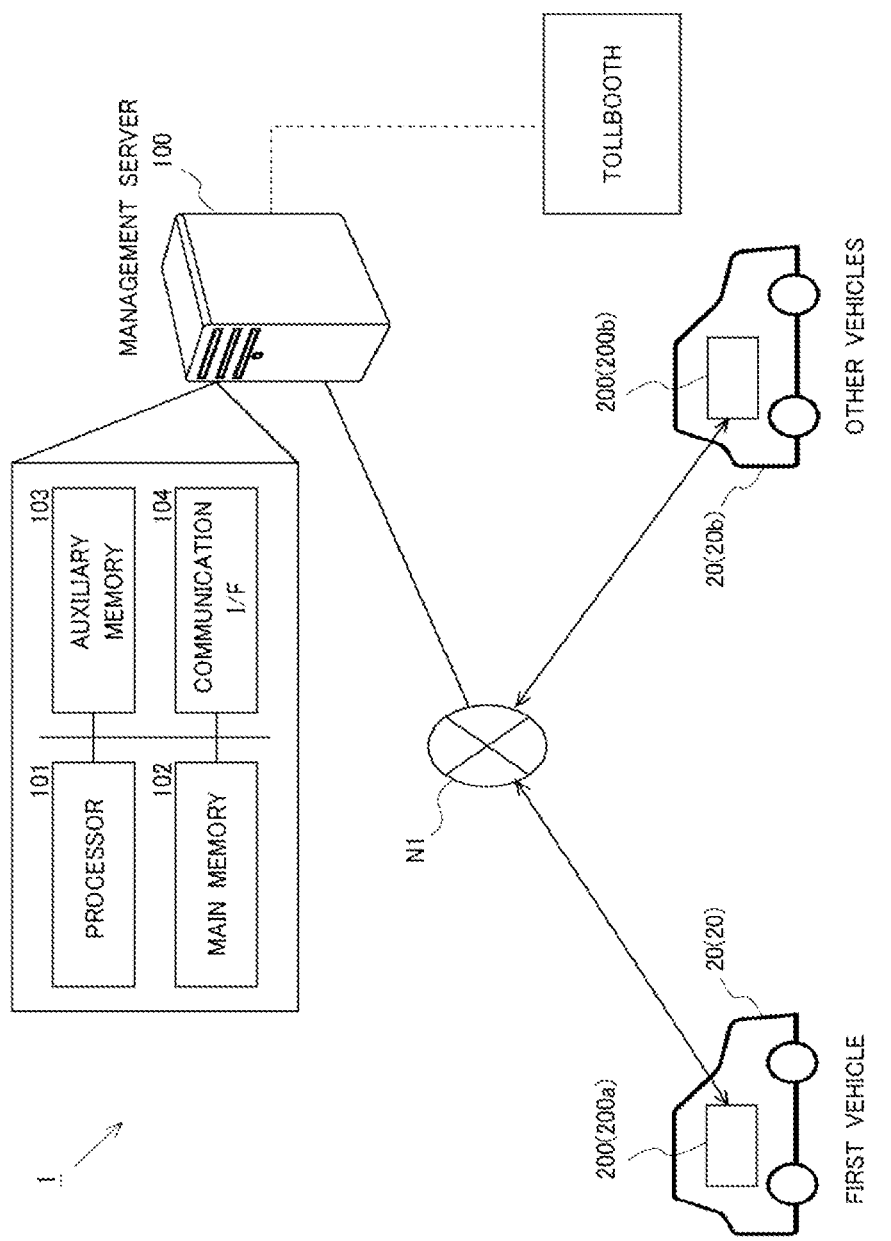
FIG. 1 is a diagram illustrating a schematic configuration of a traffic management system.

In recent years, the electronic toll collection system (ETC system) has become widespread as a toll collection system at tollbooths on vehicle roads. A vehicle equipped with an ETC device for using the ETC system (that is, a vehicle compatible with the ETC system) will hereinafter be referred to as an "ETC vehicle", whereas a vehicle not equipped with an ETC device (that is, a vehicle not compatible with the ETC system) will hereinafter be referred to as a "non-ETC vehicle".

In addition, the vehicle lanes at a tollbooth can be classified into at least three types: "ETC lane", "non-ETC lane", and "shared lane". Here, ETC lanes are lanes to which the ETC system is applied, and are lanes dedicated to ETC vehicles. Non-ETC lanes are lanes to which the ETC system is not applied. Shared lanes are shared lanes for ETC vehicles and non-ETC vehicles, and are lanes to which the ETC system is applied, but are lanes in which both ETC vehicles and non-ETC vehicles are allowed to travel.

Here, a target vehicle scheduled to pass through the tollbooth is referred to as a "first vehicle". In the information processing apparatus according to this disclosure, a controller selects a plurality of candidate lanes in which the first vehicle can travel at the tollbooth. At this time, the candidate lanes are selected based on whether or not the first vehicle is an ETC vehicle, and the type of each lane at the tollbooth. If there is a closed lane in which vehicle traveling is banned at the tollbooth, the candidate lanes are selected from the lanes other than the closed lane.

The controller calculates a predicted value for each candidate lane. The predicted value calculated here is a value that correlates with the time predicted to be required for the first vehicle traveling in the candidate lane to pass through the tollbooth. The predicted value for each candidate lane can be calculated based on, for example, the type of each candidate lane and the situation of other vehicles (vehicles other than the first vehicle) in each candidate lane.

The controller then determines a recommended lane from a plurality of candidate lanes based on the predicted value for each candidate lane. Here, the recommended lane is a lane that is recommended for the first vehicle to travel when passing through the tollbooth. Determining the recommended lane in this way makes it possible to indicate a lane in which the first vehicle can pass through the tollbooth more quickly to the driver of the first vehicle. Hence, smoother vehicle passage through a tollbooth on a vehicle road can be achieved.

Specific embodiments of this disclosure will now be described with reference to the accompanying drawings. The dimensions, materials, shapes, relative positions thereto and the like of the components described in the embodiments are not intended to limit the technical scope of this disclosure thereto unless otherwise noted.

First Embodiment

An embodiment in which the information processing apparatus, the information processing method, and the program according to this disclosure are applied to a traffic management system will now be described. The traffic management system according to this embodiment is a system for managing vehicle passage through a tollbooth on a vehicle road.

(System Overview)

FIG. 1 is a diagram illustrating a schematic configuration of a traffic management system according to this embodiment. The traffic management system 1 includes a management server 100 and in-vehicle devices 200 mounted on the respective vehicles 20. In the traffic management system 1, the management server 100 and each in-vehicle device 200 are connected to each other via a network N1. The network N1 may be, for example, a wide area network (WAN) which is a worldwide public communication network, such as the Internet, or telephone communication networks for cellular phones and the like.

The management server 100 is a server device for managing the traveling of each vehicle passing through the tollbooth. To be specific, the management server 100 is a device which executes various processes for notifying a recommended lane that is recommended for the target vehicle to travel at the tollbooth to the driver of the target vehicle scheduled to pass through the tollbooth having a plurality of vehicle lanes. The management server 100 includes a general-purpose computer. The computer constituting the management server 100 includes a processor 101, a main memory 102, an auxiliary memory 103, and a communication interface (communication I/F) 104.

Here, the processor 101 is a central processing unit (CPU) or a digital signal processor (DSP), for example. The main memory 102 is, for example, a random access memory (RAM). The auxiliary memory 103 is, for example, a read only memory (ROM), a hard disk drive (HDD), or a flash memory. The auxiliary memory 103 can include a removable medium (a portable recording medium). Here, the removable medium is, for example, a USB memory, an SD card, or a disc recording medium, such as a CD-ROM, a DVD disc, or a Blu-ray disc. The communication I/F 104 is, for example, a local area network (LAN) interface board or a wireless communication circuit for wireless communication.

The auxiliary memory 103 stores an operating system (OS), various programs, various information tables, and the like. The processor 101 loads the program stored in the auxiliary memory 103 into the main memory 102 and executes it, thereby achieving processing for notifying the target vehicle of the recommended lane described later. However, some or all of the functions of the management server 100 may be implemented using a hardware circuit such as an ASIC or FPGA. Note that the management server 100 should not necessarily be implemented by a single physical component and may consist of multiple computers in cooperation together. The auxiliary memory 103 stores tollbooth information containing information on the type of each lane at the tollbooth. The details of this tollbooth information will be described later.

The vehicle 20 is a vehicle scheduled to pass through the tollbooth. The in-vehicle device 200 includes a computer that can be mounted on the vehicle 20. Similarly to the management server 100, the computer constituting the in-vehicle device 200 includes a processor, a main memory unit, an auxiliary memory unit, and a communication interface (communication I/F).

The in-vehicle device 200 mounted on each vehicle 20 transmits vehicle information containing ETC information indicating whether or not the own vehicle 20 is an ETC vehicle, and positional information on the own vehicle 20 to the management server 100.

The vehicle 20 scheduled to pass through the tollbooth and is supposed to notified of a recommended lane by the management server 100 will hereinafter be referred to as "first vehicle 20a". The in-vehicle device 200 mounted on the first vehicle 20a will be referred to as "in-vehicle device 200a". The vehicles 20 other than the first vehicle 20a will be referred to as "other vehicles". The in-vehicle devices 200 mounted on the other vehicles 20b will be referred to as "in-vehicle devices 200b". Note that the other vehicles 20b include vehicles that are ahead of the first vehicle 20a and are waiting for passage in the lanes at the tollbooths (which may be hereinafter be referred to as "waiting vehicles").

(Traffic Conditions at Tollbooth)

Figure 2:
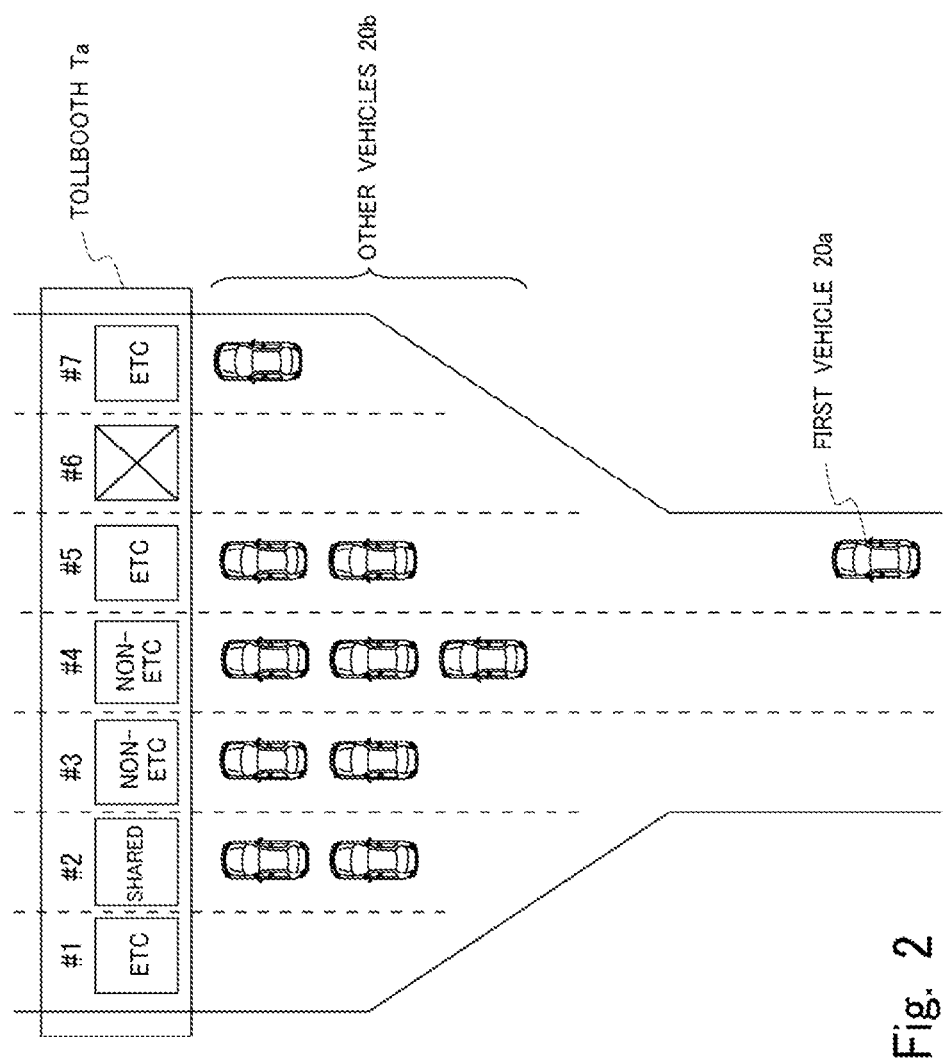
FIG. 2 is a diagram for explaining an example of traffic conditions at a tollbooth.

FIG. 2 is a diagram for explaining an example of traffic conditions at a tollbooth. The tollbooth Ta illustrated in FIG. 2 is a tollbooth through which the first vehicle 20a is scheduled to go. This tollbooth Ta has seven vehicle lanes.

Here, the seven lanes at the tollbooth Ta are referred to as first to seventh lanes #1 to #7 in order from the left in FIG. 2.

As illustrated in FIG. 2, at the tollbooth Ta, the first lane #1, the fifth lane #5, and the seventh lane #7 are ETC lanes, the third lane and the fourth lane #4 are non-ETC lanes, and the second lane #2 is a shared lane. At the tollbooth Ta, the sixth lane #6 is a closed lane (that is, a lane in which vehicle traveling is banned). Further, at the tollbooth Ta, other vehicles 20b are not lined up in the first lane #1 (number of waiting vehicles 20b: 0). Two other vehicles are lined up in the second lane #2, the third lane #3, and the fifth lane #5 (number of waiting vehicles 20b: 2). Three other vehicles 20b are lined up in the fourth lane #4 (number of waiting vehicles 20b: 3). One other vehicle is lined up in the seventh lane #7 (number of waiting vehicles 20b: 1).

At this time, the lane in which the first vehicle 20a is allowed to travel at the tollbooth Ta is determined depending on whether the first vehicle 20a is an ETC vehicle or a non-ETC vehicle. However, when the first vehicle 20a travels in any of the available lanes and passes through the tollbooth Ta, the time required for the passage varies depending on the situation of the waiting vehicles 20b in each lane. In order to make the passage of the vehicle 20 smooth at the tollbooth Ta, the first vehicle 20a preferably passes through the tollbooth Ta as quickly as possible.

For this reason, in the traffic management system 1, the management server 100 determines a recommended lane recommended for the first vehicle 20a to travel based on whether or not the first vehicle 20a is an ETC vehicle, the type of each lane at the tollbooth, and the situations of the waiting vehicles 20b in each lane.

(Functional Configuration)

Figure 3:
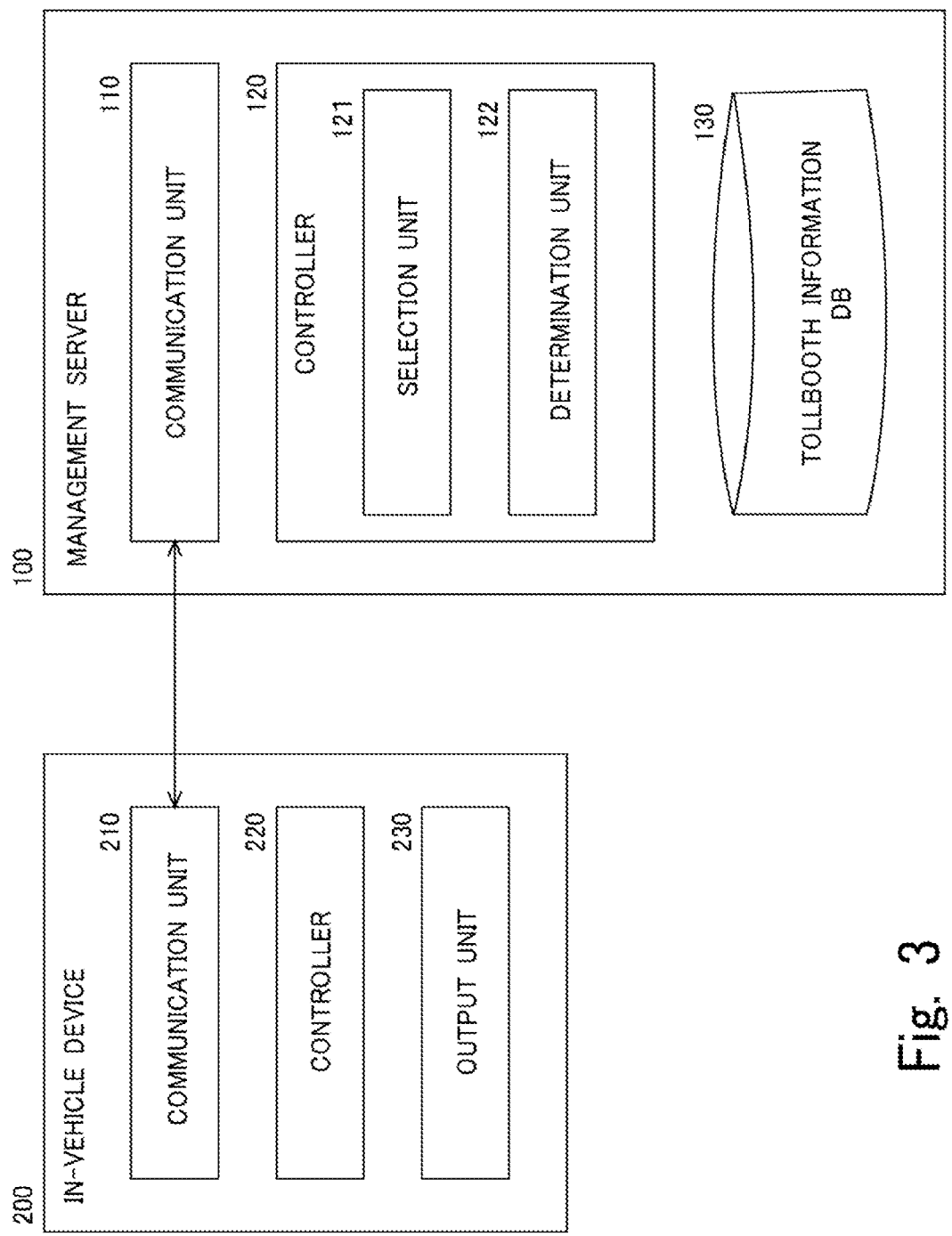
FIG. 3 is a block diagram schematically illustrating an example of the functional configurations of a management server and an in-vehicle device.

Here, the functional configurations of the management server 100 and the in-vehicle devices 200 constituting the traffic management system 1 according to this embodiment will be described with reference to FIG. 3. FIG. 3 is a block diagram schematically illustrating an example of the functional configurations of the management server 100 and the in-vehicle device 200.

(In-Vehicle Device)

The in-vehicle device 200 includes a communication unit 210, a controller 220, and an output unit 230. The communication unit 210 has the function of connecting the in-vehicle device 200 to the network N1. The communication unit 210 can be implemented using a communication I/F.

The controller 220 has the function of performing arithmetic processing for controlling the in-vehicle device 200. The controller 220 can be implemented using a processor. The controller 220 performs processing for transmitting vehicle information to the management server 100 through the communication unit 210. FIG. 4 is a diagram illustrating an example of a vehicle information table configuration transmitted from the in-vehicle device 200 to the management server 100. As illustrated in FIG. 4, the vehicle information has a vehicle ID field, an ETC information field, and a positional information field. In the vehicle ID field, a vehicle ID, which is identification information for identifying the vehicle 20 equipped with the in-vehicle device 200, is entered. In the ETC information field, information indicating whether the vehicle 20 equipped with the in-vehicle device 200 is an ETC vehicle or a non-ETC vehicle is entered. In the positional information field, information indicating the current position of the vehicle 20 equipped with the in-vehicle device 200 is entered. Note that the current position of the vehicle 20 is detected by a global positioning system (GPS) device provided in the vehicle 20.

The vehicle information is transmitted from the in-vehicle device 200 of each vehicle 20 existing in a predetermined area before the tollbooth to the management server 100 at a predetermined cycle.

Further, in the in-vehicle device 200a of the first vehicle 20a, the controller 220 performs processing for transmitting request information requesting notification of a recommended lane to the management server 100 through the communication unit 210.

The output unit 230 has the function of outputting information to be notified to the driver of the vehicle 20 inside the vehicle 20. For example, the output unit 230 may include a monitor provided inside the vehicle 20 and visible to the driver of the vehicle 20. The output unit 230 may include a speaker that emits sound to the inside of the vehicle 20.

In the in-vehicle device 200a of the first vehicle 20a, the controller 220 performs processing for receiving the notification information notifying the recommended lane transmitted from the management server 100 through the communication unit 210. The controller 220 also performs processing of outputting the recommended lane included in the notification information received from the management server 100 through the output unit 230. At this time, if the output unit 230 includes a monitor, the recommended lane is output to the monitor as an image. If the output unit 230 includes a speaker, the recommended lane is output as sound from the speaker.

(Management Server)

The management server 100 includes a communication unit 110, a controller 120, and a tollbooth information database (tollbooth information DB) 130. The communication unit 110 has the function of connecting the management server 100 to the network N1. The communication unit 110 can be implemented using the communication I/F 104.

The controller 120 has the function of performing arithmetic processing for controlling the management server 100. The controller 120 can be implemented using the processor 101. The controller 120 performs processing for receiving the vehicle information transmitted from each in-vehicle device 200, through the communication unit 110. The controller 120 also performs processing for receiving the request information transmitted from the in-vehicle device 200a of the first vehicle 20a, through the communication unit 110. In addition, the controller 120 uses the communication unit 110 to perform processing for transmitting notification information to the in-vehicle device 200a of the first vehicle 20a.

The tollbooth information DB 130 stores tollbooth information. Here, the tollbooth information includes information on the type of each lane at the tollbooth and information on the situations of the waiting vehicles 20b in each lane. FIG. 5 is a diagram illustrating an example of a tollbooth information table configuration stored in a tollbooth information DB 130. As illustrated in FIG. 5, the tollbooth information contains a lane No. field, a type field, the number of waiting vehicles field, and the number of ETC vehicles field. Lane numbers for identifying the respective lanes are entered in the lane No. field. Information indicating the type of each lane is entered in the type field. Information indicating the number of waiting vehicles 20b in each lane is entered in the number of waiting vehicles field. Information indicating the number of ETC vehicles among the waiting vehicles 20b in each lane is entered in the number of ETC vehicles field. The tollbooth information DB 130 is constructed in the auxiliary memory 103 when the processor 101 executes the program of the database management system.

Here, in the number of waiting vehicles field and the number of ETC vehicles field, the controller 120 enters information based on the vehicle information received from the in-vehicle device 200b of each waiting vehicle 20b. To be specific, the controller 120 identifies the lanes in which the waiting vehicles 20b are in line based on the positional information on each waiting vehicle 20b contained in the vehicle information. The controller 120 then calculates the number of waiting vehicles 20b in each lane and enters them in the number of waiting vehicles field. The controller 120 also identifies the ETC vehicles in the waiting vehicles 20b in each lane based on the ETC information on each waiting vehicle 20b contained in the vehicle information. The controller 120 then calculates the number of ETC vehicles among the waiting vehicles 20b in each lane and enters them in the number of ETC vehicles field.

FIG. 5 illustrates information corresponding to the situation of each lane at the tollbooth illustrated in FIG. 2 as an example of tollbooth information. When the situations of the waiting vehicles in each lane at the tollbooth change, the information entered in the number of waiting vehicles field and the number of ETC vehicles field is updated. In the case where the type of each lane at the tollbooth is changeable, if the type of each lane is changed, the information entered in the type field is updated accordingly.

As described above, in this embodiment, the number of waiting vehicles 20b in each lane at the tollbooth is calculated based on the positional information on the waiting vehicles 20b. Alternatively, the waiting vehicles 20b may be detected from images taken by an outside camera provided on the first vehicle 20a or a camera provided at the tollbooth or the road. In addition, the number of waiting vehicles 20b in each lane at the tollbooth may be calculated based on the detection result. In this case, data of images taken by the outside camera provided on the first vehicle 20a or the camera provided at the tollbooth or the road is transmitted to the management server 100.

The controller 120 also includes a selection unit 121 and a determination unit 122. The selection unit 121 has the function of selecting a plurality of candidate lanes in which the first vehicle 20a can travel at the tollbooth. The determination unit 122 has the function of determining a recommended lane for the first vehicle 20a from a plurality of candidate lanes selected by the selection unit 121.

(Information Processing)

The information processing executed by the management server 100 and the in-vehicle device 200a mounted on the first vehicle 20a will now be explained with reference to FIGS. 6 and 7.

Figure 6:
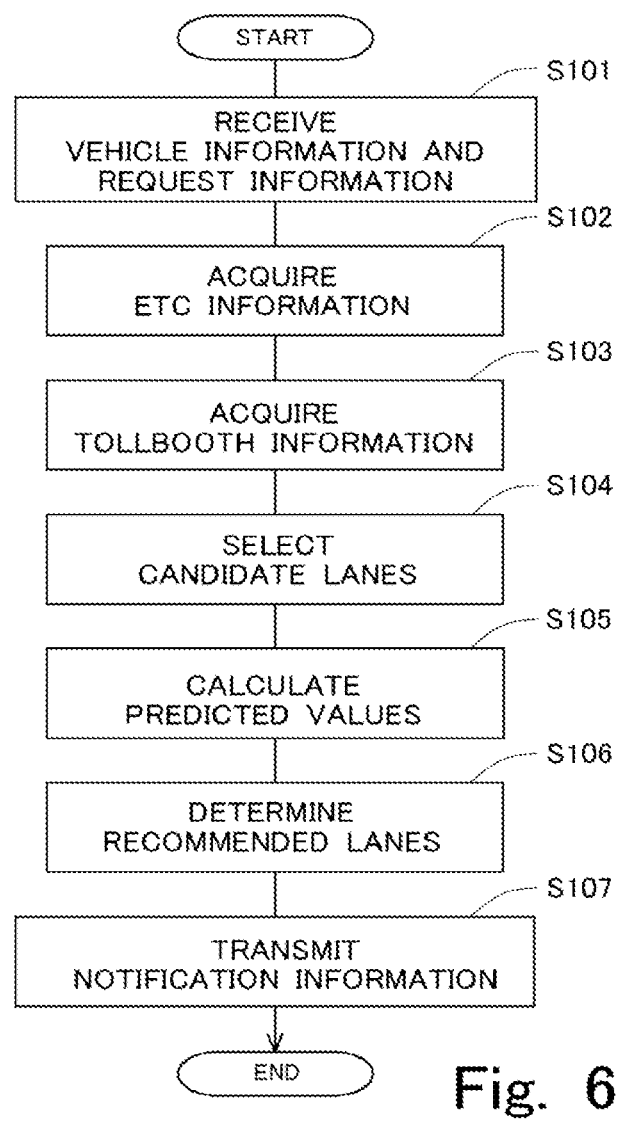
FIG. 6 is a flowchart illustrating the flow of information processing executed by a controller of the management server according to a first embodiment.

FIG. 6 is a flowchart illustrating the flow of information processing executed by the controller 120 in order to notify the first vehicle 20a of the recommended lane on the management server 100.

In this flow, the vehicle information and the request information on the first vehicle 20a transmitted from the in-vehicle device 200a of the first vehicle 20a are first received in S101. As will be described later, the vehicle information and the request information for the first vehicle 20a may be received at different timings. In subsequent S102, the ETC information contained in the vehicle information on the first vehicle 20a received from the in-vehicle device 200a is acquired. In subsequent S103, the tollbooth information stored in the tollbooth information DB 130 is acquired.

In subsequent S104, a plurality of candidate lanes are selected based on the ETC information and the tollbooth information on the first vehicle 20a. At this time, the candidate lanes are selected based on whether or not the first vehicle 20a is an ETC vehicle and the type of each lane at the tollbooth. Whether or not the first vehicle 20a is an ETC vehicle can be determined based on the ETC information. The type of each lane at the tollbooth can be determined based on the type contained in the tollbooth information.

For example, in the situation as illustrated in FIG. 2, if the first vehicle 20a is an ETC vehicle, the lanes that the first vehicle 20a can pass through are the six lanes other than the closed sixth lane #6. Thus, in this case, the first to fifth lanes #1 to #5 and the seventh lane #7 are selected as candidate lanes in S103. In the situation as illustrated in FIG. 2, if the vehicle 20a is a non-ETC vehicle, the lanes that the first vehicle 20a can pass through are the three lanes: the second to fourth lanes #2 to #4. Thus, in this case, the second to fourth lanes #2 to #4 are selected as candidate lanes in S103.

In subsequent S105, the predicted value is calculated for each candidate lane based on the tollbooth information. The predicted value for a candidate lane calculated here is a value that correlates with the time predicted to be required for the first vehicle 20a traveling in the candidate lane to pass through the tollbooth. The time required for the first vehicle 20a to pass through the tollbooth (which may hereinafter be referred to as "passage time") correlates with the type of the lane in which the first vehicle 20a travels when passing through the tollbooth, and the number of waiting vehicles 20b in the lane. Therefore, in S105, the predicted value is calculated for each candidate lane based on the type of each candidate lane contained in the tollbooth information and the number of waiting vehicles 20b in each candidate lane. The predicted value for a candidate lane whose type is the shared lane is calculated based on the number of waiting vehicles 20b in the candidate lane and the ratio of ETC vehicles in the waiting vehicles 20b.

For instance, when the number of waiting vehicles 20b is the same, the passage times for the ETC lanes are expected to be shorter than the passage times for the non-ETC lanes. When the number of waiting vehicles 20b is the same and some of the waiting vehicles 20b in the shared lane are ETC vehicles and the others are non-ETC vehicles, the passage time for the shared lane is expected to be longer than the passage times for the ETC lanes and shorter than the passage times for the non-ETC lanes. When the lanes are of the same type, it is basically predicted that the larger the number of waiting vehicles 20b, the longer the passage time. In the shared lane, however, if the number of waiting vehicles 20b is the same, it is expected that the higher the ratio of the ETC vehicles in the waiting vehicles 20b, the shorter the passage time.

Considering these points, it is expected that, in the situation as illustrated in FIG. 2, the passage time for the first lane #1 is the shortest, and when sorted in order of ascending passage time, the seventh lane #7, the fifth lane #5, the third lane #3, the second lane #2, the third lane #3, and the fourth lane #4 are ranked in this order. As illustrated in FIG. 5, of the two waiting vehicles 20b in the second lane #2, whose type is a shared lane, one is an ETC vehicle and the other is a non-ETC vehicle. Hence, it is expected that the passage time of the second lane #2 is shorter than the passage time of the third lane #3 which also has two waiting vehicles 20b and is a non-ETC lane. It is also predicted that the passage time of the second lane #2 is longer than the passage time of the fifth lane #5 which also has two waiting vehicles 20b and is an ETC lane.

In S105, the predicted value is calculated for each candidate lane considering the relative relationship between the passage times as described above. Note that the predicted value may be simply the predicted passage time. In subsequent S106, a recommended lane is determined from a plurality of candidate lanes based on the predicted value for each candidate lane calculated in S105. Here, of the plurality of candidate lanes, the lane whose predicted value indicates that the predicted passage time is the shortest is determined as a recommended lane.

For instance, in the situation as illustrated in FIG. 2, if the first vehicle 20a is an ETC vehicle, the candidate lanes are the first to fifth lanes #1 to #5 and the seventh lane #7 as described above. In this case, in S105, the first lane #1 is determined as a recommended lane. In the situation as illustrated in FIG. 2, if the vehicle 20a is a non-ETC vehicle, the candidate lanes are the second to fourth lanes #2 to #4 as described above. In this case, in S106, the second lane #2 is determined as a recommended lane.

In subsequent S107, the notification information notifying the recommended lane determined in S106 is transmitted to the in-vehicle device 200a of the first vehicle 20a.

Figure 7:
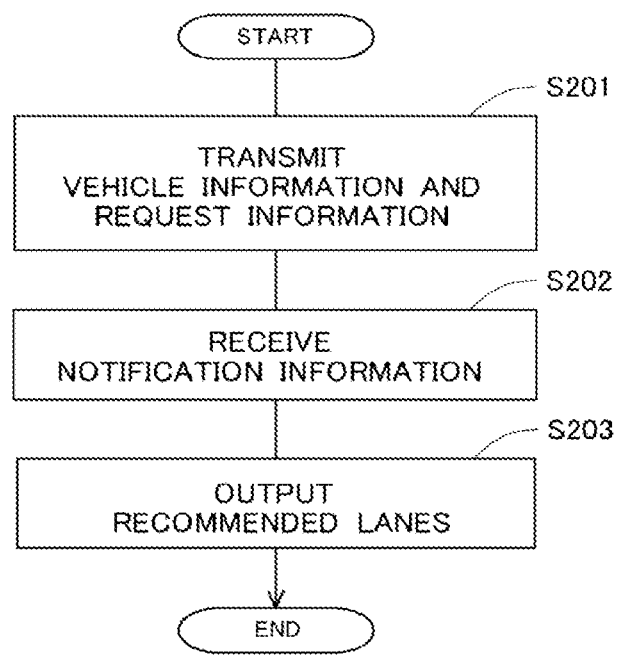
FIG. 7 is a flowchart illustrating the flow of information processing executed by the controller of the in-vehicle device.

FIG. 7 is a flowchart illustrating the flow of information processing in the in-vehicle device 200a of the first vehicle 20a executed by the controller 220 in order to output the recommended lane to the inside of the first vehicle 20a.

In this flow, first, in S201, the vehicle information on the first vehicle 20a and the request information are transmitted to the management server 100. Note that the vehicle information on the first vehicle 20a is transmitted to the management server 100 at a predetermined cycle. For this reason, the request information may be transmitted to the management server 100 at a different timing from the vehicle information. In this case, the management server 100 receives the request information separately from the vehicle information on the first vehicle 20a.

In subsequent S202, the notification information transmitted to the in-vehicle device 200a is received when the controller 120 of the management server 100 executes the flow illustrated in FIG. 6. In subsequent S203, the recommended lane contained in the notification information received in S202 is output through the output unit 230.

The aforementioned information processing in the management server 100 and the in-vehicle device 200a makes it possible to indicate a lane in which the first vehicle 20a can pass through the tollbooth more quickly to the driver of the first vehicle 20a. Thus, the traffic management system 1 according to this embodiment can make vehicle passage smoother at a tollbooth on a vehicle road.

Second Embodiment

The schematic configuration of the traffic management system according to this embodiment is the same as in the first embodiment. Further, also in this embodiment, similarly to the first embodiment, the management server 100 selects a plurality of candidate lanes in which the first vehicle 20a scheduled to pass through the tollbooth can travel. Further, the management server 100 determines a recommended lane recommended for the first vehicle 20a to travel from the plurality of candidate lanes, and transmits the notification information to the in-vehicle device 200a of the first vehicle 20a. However, in this embodiment, the management server 100 determines a recommended lane considering not only the predicted passage time for each candidate lane but also the ease of entry of the first vehicle 20a for each candidate lane.

(Information Processing)

The information processing executed in the management server 100 will now be explained with reference to FIG. 8.

Also in this embodiment, the flow of information processing executed in the in-vehicle device 200a of the first vehicle 20a is the same as the flow illustrated in FIG. 7 described above.

Figure 8:
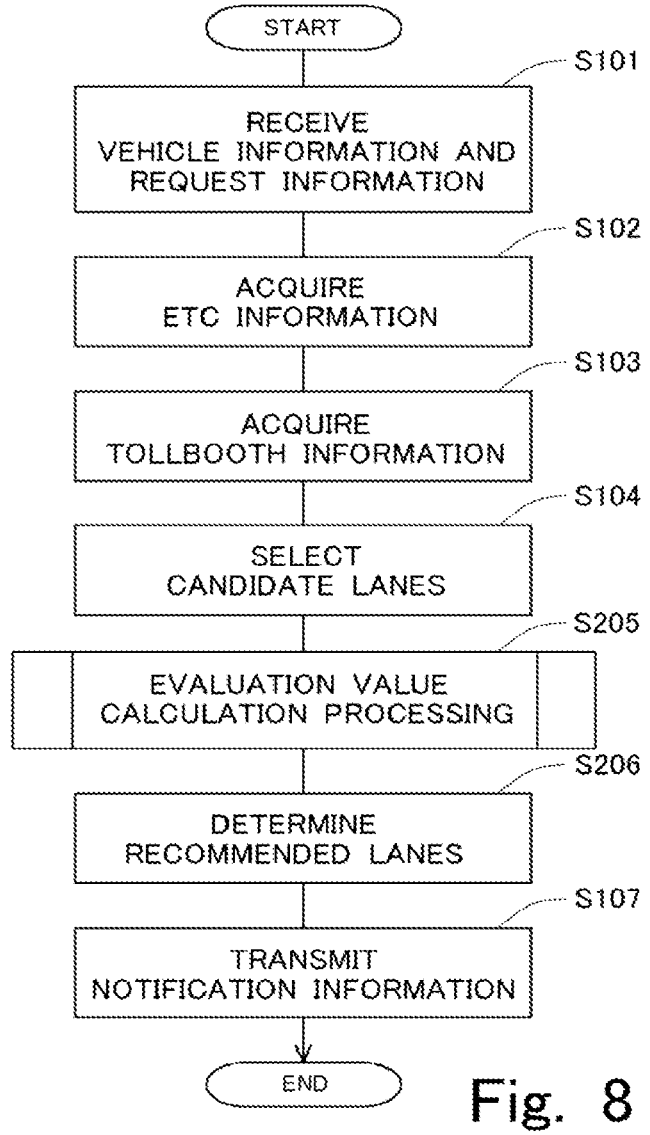
FIG. 8 is a flowchart illustrating the flow of information processing executed by the controller of the management server according to a second embodiment.

FIG. 8 is a flowchart illustrating the flow of information processing executed by the controller 120 in order to notify the first vehicle 20a of the recommended lane on the management server 100. The steps S101 to S104 and S107 in this flow execute the same processing as the respective steps with the same reference numbers in the flow illustrated in FIG. 6 described above. For this reason, only S205 and S206 which execute processing different from that in the flow illustrated in FIG. 6 will be explained below.

In this flow, when a plurality of candidate lanes in S104 are selected, the processing of S205 is then executed. In S205, the evaluation value calculation processing for calculating the evaluation value for each candidate lane is executed.

Figure 9:
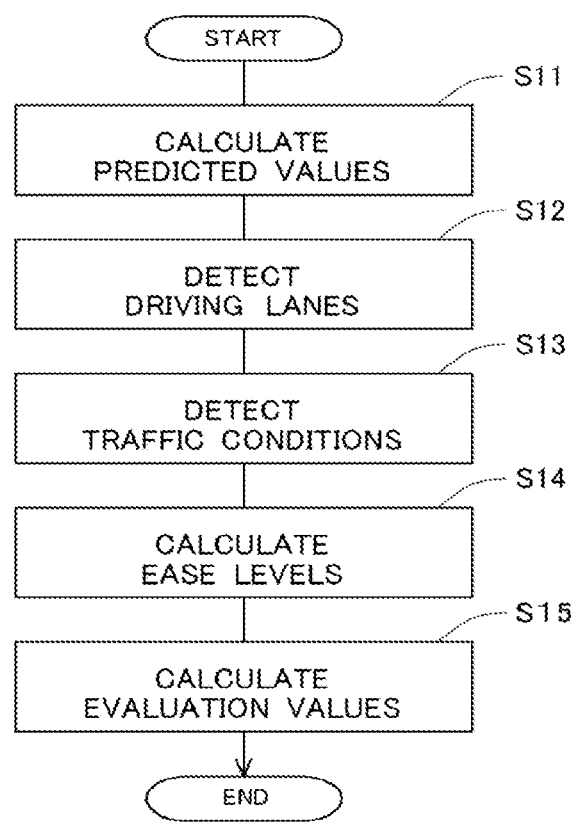
FIG. 9 is a flowchart illustrating the flow of evaluation value calculation processing according to the second embodiment.

The flow of evaluation value calculation processing executed in S205 will now be explained with the flow chart illustrated in FIG. 9. FIG. 9 is a flowchart illustrating a flow of evaluation value calculation processing executed by the controller 120. In the flow illustrated in FIG. 9, first, the predicted value is calculated for each candidate lane based on the tollbooth information in S11. The specific processing executed in S11 is the same as the processing executed in S105 of the flow illustrated in FIG. 6.

In subsequent S12, a driving lane that is the lane in which the first vehicle 20a is currently traveling is detected based on the positional information contained in the vehicle information on the first vehicle 20a. In subsequent S13, the current traffic conditions around the first vehicle 20a are detected. The traffic conditions detected here are, for example, the speeds of the other vehicles 20b traveling around the first vehicle 20a, and the traffic volume. Such traffic conditions can be detected based on the positional information on the other vehicles 20b contained in the vehicle information transmitted from the in-vehicle device 200b of each of the other vehicles 20b traveling around the first vehicle 20a to the management server 100. In S12 and S13, the driving lane of the first vehicle 20a and the traffic conditions around the first vehicle 20a may be detected from images taken by the outside camera provided on the first vehicle 20a or the camera provided at the tollbooth or the road.

In subsequent S14, the ease level indicating the level of ease of entry of the first vehicle 20a is calculated for each candidate lane. Here, the ease level for each candidate lane is calculated based on the number of lane changes needed for the first vehicle 20a to enter each candidate lane from the driving lane detected in S12, and the traffic conditions around the first vehicle 20a detected in S13.

For instance, it is expected that the larger the number of lane changes needed for the first vehicle 20a to enter another lane from the driving lane, the more difficult it is for the first vehicle 20a to enter the other lane. Therefore, in the situation as illustrated in FIG. 2, the first vehicle 20a entering the fifth lane #5 does not need to change lanes, and the fifth lane #5 is therefore expected to be the easiest. When sorted in order of descending ease level, the fourth lane #4, the third lane #3, the seventh lane #7, the second lane #2, and the first lane #1 are expected to be ranked in this order (however, in the third lane #3 and the seventh lane #7, the number of lane changes needed for the first vehicle 20a to enter these lanes is the same, so that the ease level is also expected to be the same.)

When the first vehicle 20a changes lanes in order to enter another lane from the driving lane, it is expected that the faster the speed of the other vehicles 20b traveling around the first vehicle 20a, or the greater the traffic volume of the other vehicles 20b traveling around the first vehicle 20a, the lower the ease level.

In S14, the ease level is calculated for each candidate lane considering the aforementioned points. In subsequent S15, the evaluation value is calculated for each candidate lane based on the predicted value calculated in S11 and the ease level calculated in S14. At this time, for the lane in which the first vehicle 20a can pass through the tollbooth more smoothly, a higher evaluation value may be given by the calculation.

The explanation now returns to the flow illustrated in FIG. 8. In the flow illustrated in FIG. 8, when the evaluation value for each candidate lane is calculated in S205, the processing of S206 is then executed. In S206, a recommended lane is determined from a plurality of candidate lanes based on the evaluation value for each candidate lane calculated in S205. Here, of the plurality of candidate lanes, the lane with the highest evaluation value is determined as a recommended lane. The processing of S107 is then executed.

The aforementioned information processing in the management server 100 makes it possible to indicate a lane in which the first vehicle 20a can pass through the tollbooth more smoothly to the driver of the first vehicle 20a. Thus, the traffic management system 1 according to this embodiment can also make vehicle passage smoother at a tollbooth on a vehicle road.

(Modification)

A modification of the second embodiment will now be described. In this modification, the vehicle information transmitted from the in-vehicle device 200a of the first vehicle 20a to the management server 100 contains the location information on the location of the driver's seat in the first vehicle 20a (that is, information indicating whether the first vehicle 20a is right-hand drive or left-hand drive). The controller 120 of the management server 100 then calculates the ease level for each candidate lane considering the number of lane changes needed for the first vehicle 20a to enter each candidate lane and the traffic conditions around the first vehicle 20a, and also the relationship between the lane change directions and the location of the driver's seat in the first vehicle 20a, in the evaluation value calculation processing.

For instance, if the first vehicle 20a is right-hand drive, it is expected that changing the lane to the left is less easy than changing the lane to the right. On the contrary, if the first vehicle 20a is left-hand drive, it is expected that changing the lane to the right is less easy than changing the lane to the left. In the evaluation value calculation processing according to this modification, the ease level is calculated for each candidate lane considering these points.

This makes it possible to calculate the ease level for each candidate lane with higher accuracy. As a result, the accuracy of calculating the evaluation value for each candidate lane can be improved. Hence, the recommended lane can be determined more accurately.

Third Embodiment

The schematic configuration of the traffic management system according to this embodiment is the same as in the first embodiment. Further, also in this embodiment, similarly to the second embodiment, the management server 100 calculates the evaluation value for each candidate lane based on the predicted value and the ease level. The management server 100 determines a recommended lane recommended for the first vehicle 20a to travel from the plurality of candidate lanes based on the evaluation value for each candidate lane, and transmits the notification information to the in-vehicle device 200a of the first vehicle 20a.

However, in this embodiment, the vehicle information transmitted from the in-vehicle device 200a of the first vehicle 20a to the management server 100 contains history information on the driving history of the driver of the first vehicle 20a at its previous passage through the tollbooth. Note that the driving history at passage through the tollbooth may be a driving history of passage of the first vehicle 20a through a tollbooth different from the tollbooth that the first vehicle 20a is scheduled to pass through, or a driving history of the first vehicle 20a at the previous passage through a tollbooth different from the tollbooth that the first vehicle 20a is scheduled to pass through. The management server 100 then weights the predicted value and the ease level for each candidate lane based on the history information of the driver of the first vehicle 20a. Further, the management server 100 calculates the evaluation value based on the weighted predicted value and ease level for each candidate lane.

(Information Processing)

Figure 10:
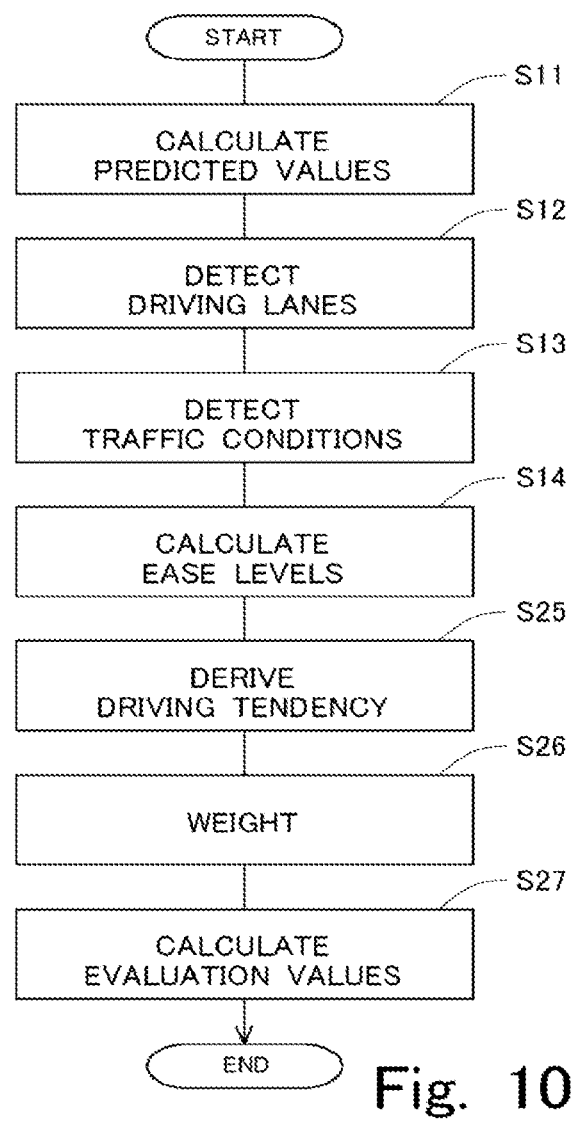
FIG. 10 is a flowchart illustrating the flow of evaluation value calculation processing according to a third embodiment.

The information processing performed in the management server 100 will now be explained with reference to FIG. 10. Also in this embodiment, the flow of information processing performed in the in-vehicle device 200a of the first vehicle 20a is the same as the flow illustrated in FIG. 7 described above.

Also in this embodiment, in the management server 100, in order to notify the first vehicle 20a of the recommended lane, the controller 120 executes information processing similar to the flow illustrated in FIG. 8 described above. However, in this embodiment, the flow of the evaluation value calculation processing executed in S205 of the flow illustrated in FIG. 8 is partially different from the flow illustrated in FIG. 9. FIG. 10 is a flowchart illustrating the flow of evaluation value calculation processing according to this embodiment. The steps S11 to S14 in this flow execute the same processing as the respective steps with the same reference numbers in the flow illustrated in FIG. 9 described above. For this reason, only S25 to S27 which execute processing different from that in the flow illustrated in FIG. 9 will be explained below.

In this flow, when the ease level for each candidate lane is calculated in S14, the processing of S25 is then executed. In S25, the driving tendency of the driver of the first vehicle 20a at the previous passage through the tollbooth is derived based on the history information contained in the vehicle information received from the in-vehicle device 200a of the first vehicle 20a. Examples of the driving tendency derived here can include passage time priority tendency and ease of entry priority tendency. For instance, if, of a plurality of lanes, a lane with a relatively short predicted passage time is selected as a driving lane because relatively many lane changes have been made for entrance in the driving history of the driver of the first vehicle 20a at the previous passage through the tollbooth, the driving tendency of the driver can be determined as passage time priority tendency that gives priority to lanes with shorter passage times. If, of a plurality of lanes, a lane with relatively fewer lane changes for entrance is selected as a driving lane even if the predicted passage time is relatively long in the driving history of the driver of the first vehicle 20a at the previous passage through the tollbooth, the driving tendency of the driver can be determined as ease of entry priority tendency that gives priority to lanes easier to enter.

Note that the driving tendency derived in S25 is not limited to passage time priority tendency and ease of entry priority tendency. For instance, a tendency related to the direction of lane change (whether the lane change is to the right lane or to the left lane) performed by the driver of the first vehicle 20a may be derived as a driving tendency. In addition, the driving tendency may be derived considering the traffic conditions around the first vehicle 20a.

In subsequent S26, weights are given to the predicted value and the ease level for each candidate lane based on the driving tendency of the driver of the first vehicle 20a derived in S25. Here, a coefficient determined based on the driving tendency of the driver of the first vehicle 20a derived in S25, for example, is used as a weight, and the predicted value and the ease level for each candidate lane may be multiplied by the coefficient.

In subsequent S27, the evaluation value is calculated for each candidate lane based on the predicted value and the ease level for each candidate lane weighted in S26. This makes it possible to calculate the evaluation value not only considering the objective situation but also considering the driving tendency of the driver of the first vehicle 20a.

The aforementioned information processing in the management server 100 makes it possible to indicate a lane in which the first vehicle 20a can pass through the tollbooth more smoothly to the driver, considering the driving tendency of the driver of the first vehicle 20a.

OTHER EMBODIMENTS

The embodiments described above are merely examples, and the present disclosure may be changed and implemented as appropriate within the scope of the disclosure. Furthermore, processes and means described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. An information processing apparatus comprising a controller configured to:

select a plurality of candidate lanes in which a first vehicle can travel at a tollbooth based on whether or not the first vehicle scheduled to pass through the tollbooth is an ETC vehicle, and a type of each lane at the tollbooth;

calculate a predicted value for each candidate lane, the predicted value being in correlation with a required time predicted to be required for the first vehicle traveling in the candidate lane to pass through the tollbooth;

determine a recommended lane that is recommended for the first vehicle to travel, from the plurality of candidate lanes based on the predicted value for each candidate lane;

calculate an ease level indicating ease of entry of the first vehicle for each candidate lane;

the controller determines the recommended lane from the plurality of candidate lanes, based on the predicted value and the ease level for each candidate lane;

weight the predicted value and the ease level for each candidate lane based on a driving history of a driver of the first vehicle at a previous passage through the tollbooth; and the controller determines the recommended lane from the plurality of candidate lanes, based on the weighted predicted value and ease level for each candidate lane, wherein the weights given to the predicted value and the ease level are determined based on whether a driving tendency at the previous passage through the tollbooth in the driving history of the driver of the first vehicle is a passage time priority tendency or ease of entry priority tendency.

2. The information processing apparatus according to claim 1, wherein the controller determines a lane for which the predicted value indicates that, of the plurality of candidate lanes, the lane has a shortest required time, as the recommended lane.

3. The information processing apparatus according to claim 1, wherein the predicted value for each candidate lane is calculated based on a type of each candidate lane, and a number of other vehicles lined up in each candidate lane.

4. The information processing apparatus according to claim 3, wherein the predicted value for the candidate lane whose type is a shared lane for ETC vehicles and non-ETC vehicles is calculated based on a ratio of ETC vehicles included in the other vehicles lined up in the candidate lane.

5. The information processing apparatus according to claim 1, wherein the ease level for each candidate lane is calculated based on a number of lane changes needed for the first vehicle to enter each candidate lane.

6. The information processing apparatus according to claim 1, wherein the ease level for each candidate lane is calculated based on traffic conditions around the first vehicle.

7. The information processing apparatus according to claim 1, wherein the ease level for each candidate lane is calculated based on a relationship between a direction of a lane change needed for the first vehicle to enter each candidate lane, and a location of a driver's seat in the first vehicle.

8. The information processing apparatus according to claim 1, wherein the controller is further configured to:

receive request information that requests notification of the recommended lane from an in-vehicle device mounted on the first vehicle; and transmit notification information that notifies the recommended lane to the in-vehicle device.

9. An information processing method executed by a computer, comprising:

selecting a plurality of candidate lanes in which a first vehicle can travel at a tollbooth based on whether or not the first vehicle scheduled to pass through the tollbooth is an ETC vehicle, and a type of each lane at the tollbooth;

calculating a predicted value for each candidate lane, the predicted value being in correlation with a required time predicted to be required for the first vehicle traveling in the candidate lane to pass through the tollbooth;

determining a recommended lane that is recommended for the first vehicle to travel, from the plurality of candidate lanes based on the predicted value for each candidate lane;

calculating an ease level indicating ease of entry of the first vehicle for each candidate lane;

determining the recommended lane from the plurality of candidate lanes, based on the predicted value and the ease level for each candidate lane;

weighting the predicted value and the ease level for each candidate lane based on a driving history of a driver of the first vehicle at a previous passage through the tollbooth; and determining the recommended lane from the plurality of candidate lanes, based on the weighted predicted value and ease level for each candidate lane, wherein the weights given to the predicted value and the ease level are determined based on whether a driving tendency at the previous passage through the tollbooth in the driving history of the driver of the first vehicle is a passage time priority tendency or ease of entry priority tendency.

10. The information processing method according to claim 9, wherein a lane for which the predicted value indicates that, of the plurality of candidate lanes, the lane has a shortest required time, is determined as the recommended lane.

11. The information processing method according to claim 9, wherein the predicted value for each candidate lane is calculated based on a type of each candidate lane, and a number of other vehicles lined up in each candidate lane.

12. The information processing method according to claim 11, wherein the predicted value for the candidate lane whose type is a shared lane for ETC vehicles and non-ETC vehicles is calculated based on a ratio of ETC vehicles included in the other vehicles lined up in the candidate lane.

* * * * *